(12) United States Patent
Eyal

(10) Patent No.: US 6,344,066 B1
(45) Date of Patent: Feb. 5, 2002

(54) PROCESS FOR THE PREPARATION OF FERTILIZERS AND SULFUR COMPOUNDS

(75) Inventor: Aharon Meir Eyal, Jerusalem (IL)

(73) Assignee: Clue, Bergen (NO)

( * ) Notice: Subject to any disclaimer, the term of this patent is extended or adjusted under 35 U.S.C. 154(b) by 0 days.

(21) Appl. No.: 09/485,701

(22) PCT Filed: Aug. 25, 1998

(86) PCT No.: PCT/IL98/00408

§ 371 Date: May 24, 2000

§ 102(e) Date: May 24, 2000

(87) PCT Pub. No.: WO99/10084

PCT Pub. Date: Mar. 4, 1999

(30) Foreign Application Priority Data

Aug. 26, 1997 (IL) .................................................. 121631

(51) Int. Cl.[7] .............................................. B01D 53/34
(52) U.S. Cl. ................................... 71/34; 71/36; 71/59
(58) Field of Search ................................ 71/34, 36, 59

(56) References Cited

U.S. PATENT DOCUMENTS

| 3,421,848 A | | 1/1969 | Popovici et al. ............... 23/107 |
|---|---|---|---|
| 4,168,150 A | * | 9/1979 | Pircon et al. ................... 71/37 |
| 4,247,321 A | | 1/1981 | Persinger ........................ 71/59 |
| 5,510,094 A | | 4/1996 | Bhat et al. .............. 423/243.07 |
| 5,624,649 A | * | 4/1997 | Gal ........................ 423/243.11 |

FOREIGN PATENT DOCUMENTS

| GB | 1048134 | 11/1966 |
|---|---|---|
| WO | WO 94/12266 | 6/1994 |

\* cited by examiner

Primary Examiner—Chhaya D. Sayala
(74) Attorney, Agent, or Firm—Oblon, Spivak, McClelland, Maier & Neustadt, P.C.

(57) ABSTRACT

A method for the combined production of (I) a fertilizer selected from a group consisting of ammonium nitrate, ammonium phosphates or a combination thereof through an indirect neutralization of ammonia with an acid selected form a group consisting of nitric acid, phosphoric acid and a combination thereof and of (II) a sulfur compound selected from a group consisting of elemental sulfur, $SO_2$, sulfuric acid and sulfate salts, said method comprising (a) contacting a sulfur oxide containing gas with ammonia and an aqueous liquor, whereby a sulfur oxide containing product is formed and the resulting gas has a reduced $SO_2$ content; (b) reacting a sulfur oxide containing product resulting from step (a) with a reagent selected from a group consisting of nitric acid, phosphoric acid, a mixture thereof and salts formed by the reaction of said acids to form said fertilizer and a sulfur compund, and (c) separating at least a portion said sulfur compound from said fertilizer.

14 Claims, No Drawings

PROCESS FOR THE PREPARATION OF FERTILIZERS AND SULFUR COMPOUNDS

TECHNICAL FIELD

The present invention relates to a method for the combined production of (i) a fertilizer selected from a group consisting of ammonium nitrate, ammonium phosphate and a combination thereof through an indirect neutralization of ammonia with an acid selected from a group consisting of nitric acid, phosphoric acid and a combination thereof and of (ii) a sulfur compound selected from a group consisting of elemental sulfur, $SO_2$, sulfuric acid and sulfate salts.

BACKGROUND ART

Fertilizers are used in large volumes of millions of tons per year. They are used all over the globe and throughout most of the year. Some of said fertilizers are salts produced by direct neutralization of an acid and a base. The main examples are ammonium nitrate, which is usually formed by the direct reaction of ammonia and nitric acid, and ammonium phosphates, usually formed in a reaction between phosphoric acid and ammonia. This direct reaction produces neutralization energy. The number of applications for said neutralization energy is limited.

Large amounts of sulfur are used, mainly for the production of sulfuric acid, which is used mainly as an acidulant in a variety of processes. In most cases it ends up as gypsum in landfills. A typical case is that of reacting phosphate rock with sulfuric acid to form phosphoric acid for agriculture applications and gypsum by-product which needs to be disposed of. Thus, sulfur consumption in such a process adds to the environmental problem by creating gypsum, but $H_2SO_4$ is a cheap, concentrated and strong acid and therefore attractive for use. The problem could be reduced, if a good economic way was found for the recovery of sulfur compounds from flue gases thereby reducing the need to mine sulfur for use in phosphoric acid production.

Burning fossil fuel releases many millions of tons of $SO_2$ every year. Several processes were developed to absorb the $SO_2$ and convert it into sulfur or sulfuric acid. The industrial application of those technologies is very limited compared with other flue gas desulfurization processes. An important reason for that is the lack of a driving force for the separation and concentration of $SO_2$ out of flue gas. Adsorption of $SO_2$ and its release as such requires introduction of energy, usually thermal energy, which in turn consumes more fuel and adds to the problem.

The control of $SO_2$ emissions to the environment is one of the most urgent and critical problems being faced and addressed today. Annex IV to the 1994 Oslo Protocol on Further Reduction of Sulfur Emission lists general options for reduction of sulfur emissions from combustion: (i) Energy management measures including energy saving and energy mix, (ii) technological options including fuel switching, fuel cleaning, advanced combustion technologies, process and combustion modifications and flue gas desulfurization (FGD). The latter includes lime/limestone wet scrubbing (LWS), spray dryer absorption (SDA), Wellman Lord process (WL), ammonia scrubbing (AS) and combined NOx/SOx removal process (activated carbon (AC) and combined catalytic NOx/SOx removal). Two new processes, which have not passed (in 1994) the pilot stage, were listed: electron beam dry scrubbing (EBDS) and Mark 13A.

According to the Oslo Protocol, lime/limestone wet scrubbing (LWS) makes up 85% of all FGD installation. In 1995 the FGD sector accounted for 15% of all lime sales in the US, mostly through LWS. In the LWS process the acidic, gaseous $SO_2$ in the flue gas is adsorbed into a re-circulated water based slurry of gypsum+pretreated limestone, and is subsequently neutralized by reaction with the $CaCO_3$. The products of the reaction are further reacted with air to produce predominantly calcium sulfate di-hydrate. The $SO_2$ removal capacity is dependent upon the inlet $SO_2$ content of the gas, the relative flow rate of the slurry and the pH of the slurry. In order to minimize the adverse impact of soluble compounds, introduced via the flue gas and the limestone, a stream is purged out the absorber. This purge stream is typically treated to precipitate and remove the soluble compounds in solid form prior to discharge.

LWS has many drawbacks associated with handling and recycling of solids, with the relatively low rate of reaction with the water immiscible base ($CaCO_3$) and with the fact that a solid product is withdrawn from a recycling stream, which leads to build-up of soluble impurities. As reported by National Power of the U.K., the application of LWS in the 4,000 MW power unit at Drax, required an investment of about a billion USD, consumption of about 2% of the produced electric power for running the LWS unit and yearly operation costs of about $50 million.

Absorption in ammonia rather than in gypsum/lime slurry avoids many of the problems associated with the LWS process, but faces other problems. primarily associated with the cost of the ammonia. The ammonium sulfate formed in the reaction is a low-grade fertilizer, formed as a by-product of many other processes. Therefore, in most cases it does not cover the cost of ammonia.

A purpose of the present invention is to combine the production of (I) a fertilizer selected from a group consisting of ammonium nitrate and ammonium phosphates and of (II) a sulfur compound selected from a group consisting of elemental sulfur, $SO_2$, sulfuric acid and sulfate salts.

Another purpose is to produce the fertilizer through indirect neutralization of ammonia with an acid selected from a group consisting of nitric acid, phosphoric add and a combination thereof.

Another purpose is to utilize the driving force associated with the production of the fertilizer, which is available in large amounts, in many locations and through most of the year, for the production of sulfur compounds from sulfur oxides containing gases.

Still another purpose of the present invention is to reduce air pollution caused by $SO_2$.

DISCLOSURE OF THE INVENTION

With this state of the art in mind, there is now provided, according to the present invention, a method for the combined production of (I) a fertilizer selected from a group consisting of ammonium nitrate, ammonium phosphates or a combination thereof through an indirect neutralization of ammonia with an acid selected from a group consisting of nitric acid, phosphoric acid and a combination thereof and of (II) a sulfur compound selected from a group consisting of elemental sulfur, $SO_2$, sulfuric acid and sulfate salts, said method comprising:

(a) contacting a sulfur oxide containing gas, resulting from the combustion of sulfur-containing hydrocarbons, and containing carbon dioxide in concentrations greater than that of the sulfur oxide in said gas with ammonia and an aqueous liquor, whereby a sulfur oxide containing product is selectively formed and the resulting gas has a reduced $SO_2$ content;

(b) reacting a sulfur oxide containing product resulting from step (a) with a reagent selected from a group consisting of nitric acid, phosphoric acid, a mixture thereof and salts formed by the reaction of said acids to form said fertilizer and a sulfur compound, and (c) separating at least a portion of said sulfur compound from said fertilizer.

The sulfur oxide in the gas used in step (a) is in most case $SO_2$, $SO_3$ and a mixture thereof. For simplicity of presentation it will be referred to in the following as $SO_2$. The sulfur oxide containing gas could result from various industrial productions involving the combustion of sulfur-containing hydrocarbons but of be highest interest is the case of flue gas from combustion of oil and coal. Of a particularly high interest are those cases where high sulfur fuel is used. In a preferred embodiment the sulfur oxide containing gas is a product of an FGD process, more preferably FGD via the LWS. In a most preferable embodiment the flue gas is treated, by LWS or another FGD process, for the removal of less than 90% of the $SO_2$ content, more preferably less than 80%, and the resulting gas is treated according to the method of the present invention.

In U.S. Pat. No. 3,421,848 there is described a process of utilizing residual gaseous components of sulphuric acid production and ammonium phosphate production employed in a nitrogen and phosphatic fertilizer plant by absorbing $SO_2$ from the residual gases in ammonia solutions and the desorption of $SO_2$ from the ammonium sulfite-bisulfite which is obtained with an excess of phosphoric acid. Said patent, however, teaches the treatment of residual gases containing 0.2% $SO_2$ and 0.3% $SO_3$ evacuated from a sulfuric acid plant (see column 2, lines 17 and 18), which gases are known to be free of other acidic components such as $CO_2$ and therefore said patent does not teach or suggest the surprising discovery of the present invention that $SO_2$ containing gases resulting from various industrial productions involving the combustion of sulfur-containing hydrocarbons and in which $CO_2$ is inherently present in concentrations greater than that of the sulfur oxide in said gas, can be selectively reacted with ammonia, despite the presence of other impurities such as carbon dioxide in concentrations greater than that of the sulfur oxide and which would be expected to compete with the reaction of $SO_2$ with ammonia.

Furthermore, as described in column 2, lines 45–49, said process results in a solution still having its acid characteristic, which then must be transferred into the phosphatic fertilizer plant installation, the presence of which is a necessary factor for said process, since said patent also does not teach or suggest the process of the present invention as exemplified hereinafter, wherein the final solution is either acid free or has only a minor excess of acid.

The efficiency of $SO_2$ removal decreases with the decrease of its concentration in the flue gas. That is particularly true for the LWS process, as the basicity of the absorbing medium and the solubilization rate of lime are low. Thus, in the last stage or two of that process, the operation costs per unit of $SO_2$ removed are high (mainly those related to re-circulation of the slurry). An attractive integration could be the removal of, say, 70–80% of the $SO_2$ through absorption in the lime-gypsum slurry and treating the rest according to the method of the present invention. The main advantages are:

significant reduction of operating costs in existing LWS;
significant reduction of capital costs in future FGD plants;
removal of overall larger amounts of $SO_2$ per unit of reagent consumed and per unit of fertilizer formed (converting all the sulfur oxides in flue gases according to the present invention would produce more fertilizer than the present needs);

easier adjustment for varying S content in the flue gas;

nitrogen oxides which are adsorbed along with the $SO_2$ in the LWS process and form soluble calcium nitrates which present an additional load on the purge treatment in the existing LWS plants form utilizable fertilizers in the present invention;

purge from the lime FGD can be treated in the process of the present invention; and high flexibility in adjusting the mix of the reagents and products to local and period needs by adjusting the split between absorption in the lime slurry and absorption in ammonia.

Thus, in many cases the method of the present invention is more attractive than the LWS process, but also provides a means of improving existing and future LWS installations. The improvement gained is larger than that gained by combining lime and ammonia or ammonium salts in the absorbing medium as suggested in patents such as WO 9604979, and U.S. Pat. Nos. 5,017,349 and 5,510,094.

The sulfur oxide containing gas is contacted, preferably after removal of flying ash and temperature adjustment, with ammonia and an aqueous liquor, whereby a sulfur oxide containing product is formed and the resulting gas has a reduced $SO_2$ content. The ammonia can be introduced in solution or in a gaseous form. The liquor could be water or an aqueous solution, including a recycled stream containing ammonium sulfate, ammonium sulfite, a stream formed in a following step, such as a mother liquor from the separation in step (c) or a stream from another process, such as the bleed stream from the LWS plant.

The product formed contains sulfur oxides resulting from the absorption. The flue gas contains sulfur, mainly in S(IV) form, but some of it is spontaneously oxides to S(VI), so that the liquor out of step (a) contains sulfites and sulfates. If desired, particularly in those cases where the sulfur compound formed is a sulfate salt, the solution could be oxidized, preferably by air or oxygen enriched air to convert most or all of the sulfite to sulfate. Methods for effecting such oxidation are described in details in the FGD related literature.

The sulfur oxide containing product which can be a solid or liquid is reacted with a reagent selected from a group consisting of nitric acid, phosphoric acid, a mixture thereof and salts formed by the reaction of said acids. The reaction forms said fertilizer and a sulfur compound. In the cases of using as reagents acids or acidic salts, the sulfur compound could be sulfur oxide, mainly $SO_2$, the solubility of which decreases as the acidity of the solution increases. If for simplicity we represent the sulfur oxide in the liquor as ammonium sulfite, some of the reactions in this stage could be presented as:

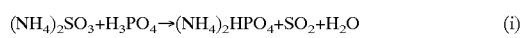  (i)

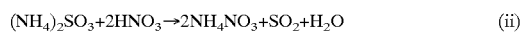  (ii)

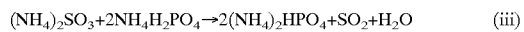  (iii)

In these reactions, as well as in the following ones, the chemistry could be much more complicated than shown by the equation.

In the prior art absorption-desorption processes for FGD (e.g. U.S. Pat. Nos. 5,458,861, 5,547,64, 5,591,417, 5,294,409, 5,202,101, 5,213,779, 5,120,517 and 5,223,237) thermal energy is introduced to desorb the absorbed $SO_2$. In another process described in Ont. Hydro Res. Q. (1975), 27(2), 19–28. $SO_2$ is adsorbed in ammonia. The solution formed is reacted with $NH_4HSO_4$ to strip the $SO_2$. The $(NH_4)_2SO_4$ formed is thermally decomposed to ammonia and $NH_4HSO_4$ for recycling. While $SO_2$ is displaced by an acidic salt as in the present method, there is no indirect neutralization to provide the driving force. The energy for $SO_2$ separation is thermal and is introduced indirectly through the decomposition of ammonium sulfate to ammonium bisulfate.

In contradistinction, in the process of the present invention, the majority of the $SO_2$ formed in the reaction separates into the vapor phase, with no need of energy introduction. The energy results from the indirect neutralization. If desired, $SO_2$ removal could be completed by heating, e.g. during concentration/crystallization of the fertilizer solution. The $SO_2$ obtained in the vapor phase could be oxidized to $SO_3$ by well-known methods and then to sulfuric acid or reduced to sulfur in a reaction with a reducing agent. Using suitable reagents and, optionally, also catalysts, oxidation and, particularly, reduction can also be effected in the liquid phase. The reactions in (i) and (iii) are particularly attractive in the case of power plants close to phosphoric acid plants. In those cases the $SO_2$ recovered in the process could be used to generate sulfuric acid for the phosphoric acid plant.

Salts formed by the reaction of nitric acid, phosphoric acid or a combination thereof are suitable reagents (even when said salts are not in acidic form). In the case of oxidation of the sulfites in the liquor formed in step (a) of the present invention to sulfates prior to the reaction, the reagent salt is selected from a group consisting of calcium nitrate and acidulated calcium phosphate. In those cases the sulfur oxides are mainly in the S(VI) form. Representing the liquor entering the reaction as containing $(NH_4)_2SO_4$, the following reactions are some of the reactions that can take place:

  (iv)

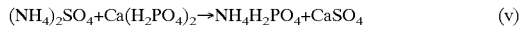  (v)

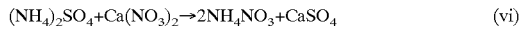  (vi)

$CaHPO_4$ and $Ca(H_2PO_4)_2$ are usually products of reacting phosphoric acid with calcium phosphate or with phosphate rock, but could be formed, if desired, in the reaction of phosphoric acid with calcium bases. $Ca(NO_3)_2$ can be produced by reacting nitric acid with calcium oxide, hydroxide or carbonate.

In a preferred embodiment of the present invention the calcium nitrate used is a product of producing phosphoric acid, using nitric acid as an acidulant. While typically phosphoric acid is produced by attacking phosphate rock with sulfuric acid, there are places where it is produced by attacking the phosphate rock with nitric acid. This process is referred to as the nitrophos process. The by-product is calcium nitrate, which is a nitrogen source in agriculture. Using it as such involve some difficulties, mainly resulting from its high hygroscopicity. Typically it is reacted to form a double salt of the overall formula $5Ca(NO_3)_2 \cdot 1NH_4NO_3$. The nitrogen content of the fertilizer in both forms is relatively low. For the purpose of the present invention, any form of calcium nitrate is suitable, including all possible products of the nitrophos process. Using calcium nitrate in a process according to the present invention results in a much more desired fertilizer of about double nitrogen content, a combination of ammoniacal and nitrate nitrogen and containing no ballast. In the case of calcium nitrate resulting from the nitrophos process, there are also processing related savings to the calcium nitrate producer.

In all the processes according to the present invention ammonia is introduced into the absorption step and an acid (nitric, phosphoric or a combination thereof) is introduced into another step. An ammonium salt of the acid is formed. Thus, the overall process related to equation (i) could be presented in a simplified form as:

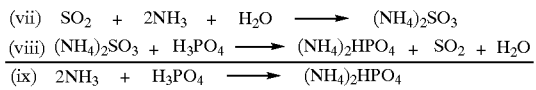

The overall reaction related to equation (iv) could be presented in a simplified form as:

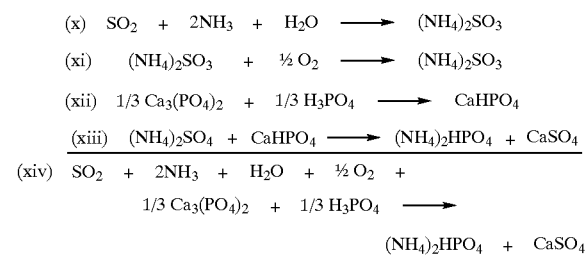

$Ca_3(PO_4)_2$, as used herein, could represent calcium phosphate as such, but in most cases it means calcium phosphate in phosphate rock, which, actually, has a more complex formula.

The overall reaction related to equation (vi) could be presented in a simplified form as:

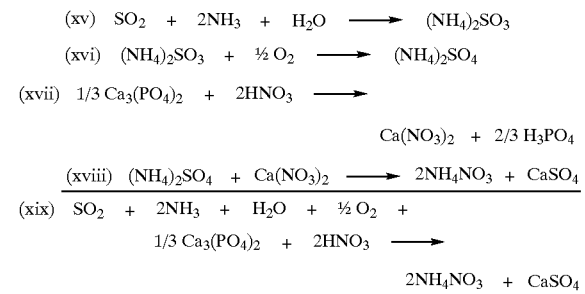

The $SO_2$ formed in any of the processes where the reagent is an acid or an acidic salt can be used to produce the phosphoric acid used in steps (viii) and (xii):

  (xx)

  (xxi)

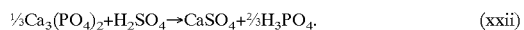  (xxii)

Other combinations are possible too, e.g. the use of $H_3PO_4$ formed in step (xvii) in steps (viii) or (xii).

In these processes, as well as all other processes according to the present invention, product salt, or at least a part of it, is formed from the base, ammonia, and the acid, which are introduced at separate steps of the process. Thus, their reaction is indirect and the energy of neutralization is not evolved as thermal energy in whole or in part. Instead, through the process, this energy, in some cases along with other energies, such as crystallization energy, provides the driving force for $SO_2$ separation from the gas containing it and for concentration to a sulfur compound to be used as such or to be converted to other sulfur compounds.

U.S. Pat. No. 5,624,649 (General Electric Co.) absorbs $SO_2$ in ammonia, oxidizes the ammonium sulfite formed to ammonium sulfate and reacts the latter with potassium chloride to form ammonium chloride and potassium sulfate. The latter reaction is conducted in an ammoniacal medium and is facilitated by the low solubility of $K_2SO_4$ in such medium. The ammoniacal medium is difficult to handle and results in losses and strong ammonia odor. This process in said U.S. patent forms ammonium sulfate and reacts it with a reagent salt to form a fertilizer, as in the method of the present invention. Yet, it differs from the present method in several important aspects. The reagent salt is KCl, which is obtained as a mineral rather than through the reaction of phosphoric or nitric acid (it could be produced by reacting a potassium base with HCl, but that is not economic). The ammonium salt formed in said U.S. Patent is ammonium chloride, rather than ammonium nitrate or phosphate as in the present process. While the ammonium fertilizers of the present invention are of higher quality compared with ammonium sulfate, the process of said U.S. patent degrades the ammonium fertilizer from sulfate to chloride. The main difference is, however, in the fact that no acid is consumed in the process of said U.S. patent (except for the $SO_2$) and therefore no neutralization energy is formed to be used as a driving force.

In U.S. Pat. No. 4,168,150 there is described a process for the production of fertilizer, which inter alia involves sulfur oxide removal in a reaction with a calcium-containing phosphate rock. Thus, unlike in the present method, the $SO_2$ is reacted with phosphate rock (which, is optionally pretreated) and not with ammonia (which could be used for final pH adjustment), and the reaction is carried out under acidic conditions required to activate the phosphate rock. That acidity is counter productive to the absorption of $SO_2$. The sulfur compound formed in that process is difficult to separate and the fertilizer formed contains it. As in U.S. Pat. No. 5,624,649, there is no significant consumption of nitric or phosphoric acid and, therefore, no significant indirect neutralization and driving force resulting from it.

The fertilizer formed in the process of the present invention could be used in solution or in a crystallized form. Energy for water evaporation could result from the thermal energy of the flue gas. $SO_2$ presence in fertilizer solutions is undesired, as this $SO_2$ will, most probably, end up in the atmosphere. In addition, $SO_2$ separation is needed to allow its use in applications such as steeping processes, sulfites and bisulfites production and for the conversion to other sulfur compounds, mainly elemental sulfur and sulfuric acid. $SO_2$ separation is relatively easy due to its high volatility, particularly in acidic solutions.

Presence of limited amounts of sulfur and sulfates in fertilizers is acceptable in many cases and even desired in a few of them. Yet, production of fertilizers, with significant contents of sulfur compounds, is not desired as sulfur compounds may not be desired and as the relatively low solubility of some sulfate salts could be a drawback in many applications. The reactions in steps (xiii) and (xix), as well as other reactions using calcium salts of nitric acid, result in highly water-soluble ammonium nitrate, phosphates or combinations thereof and in water immiscible gypsum. The solubility of gypsum is particularly low in neutral solutions as those of ammonium nitrate and diammonium phosphate. The conditions in the reactions could be adjusted to produce large gypsum crystals, which are easy to separate by filtration and to wash. Elevated temperatures and gentle mixing assist in forming such crystals.

European patent EP 0670750 by the present inventor discloses a method for reducing atmospheric pollution caused by $SO_2$ through the conversion of $SO_2$ into calcium sulfite. The $SO_2$ containing gas is reacted with ammonia and aqueous liquor to form an $SO_2$ containing product, which is reacted with calcium nitrate or calcium chloride to form calcium sulfite with the co-formation of a commercially utilizable ammonium salt as a by-product. Calcium sulfite is a less desirable by-product in certain circumstances than gypsum, particularly where there are outlets for gypsum, such as in wallboard manufacture. In addition, under acidic conditions, in both the processing steps and in storage, calcium sulfite could liberate some $SO_2$. One could use the process of said European patent followed by oxidation of the calcium sulfite to calcium sulfate, e.g. as done in the LWS process. This could even have some advantages associated with the lower solubility of calcium sulfite compared with that of gypsum. In many other cases, however, the sulfite containing liquor from the first step is better oxidized prior to the reaction with the calcium salt reagent. It was not obvious to the inventor at the time of filing the above European patent that a more advantageous process was available through the expedient of oxidation of sulfite to sulfate, which feature is now utilized for the first time in the present process.

The gypsum crystals formed according to the present invention are more regular than those of the LWS process, where they are submitted to severe attrition due to re-circulation through the high pressure centrifugal pumps. Another advantage compared with the LWS process is cleaner gypsum crystals, which are free of lime/limestone, unavoidable in the LWS process, where the reagent lime/limestone is mostly present in solid form. Still another advantage, in the case of using calcium nitrate from the nitrophos process or acidulated calcium phosphate, is no consumption of lime or lime stone. In those cases of the present invention, where the reagent calcium salt is formed by reaction of the acid with lime or limestone, the consumption of the latter will be nearly stoichiometric and, thus, significantly lower than in the LWS process. That is since it is introduced into the reaction of step (b) as a soluble compound, unlike in the LWS process.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

DESCRIPTION OF PREFERRED EMBODIMENTS

EXAMPLE 1

A gas composed of about 73% $N_2$, 13% $CO_2$, 10% $H_2O$, 4% $O_2$ and 0.3% $SO_2$ is bubbled slowly through along column containing ammonia solution. More than 90% of the $SO_2$ in the incoming gas is adsorbed.

EXAMPLE 2

Part of the solution formed in Example 1 is reacted with a solution of 30% nitric acid. The relative volumes of the solutions are selected so that the molar ratio of nitric acid to (ammonia+ammonium ions) is 1.1 to 1.0. Ammonium nitrate is formed and most of the $SO_2$ absorbed in Example 1 evolves.

EXAMPLE 3

Oxygen is bubbled through part of the solution formed in Example 1 for a time sufficient to convert most of the sulfite content to sulfate. The solution obtained is then reacted with a solution of 30% calcium nitrate from the nitrophos process. The relative volumes of the solutions are selected so that the equivalent ratio of calcium nitrate to (ammonia+ ammonium ions) is 1 to 1. Ammonium nitrate is formed and most of the sulfur oxide resulting from the absorption in Example 1 precipitates as gypsum.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for the combined production of (I) a fertilizer selected from a group consisting of ammonium nitrate, ammonium phosphates and a combination thereof through an indirect neutralization of ammonia with an acid selected from a group consisting of nitric acid, phosphoric acid and a combination thereof and of (II) a sulfur compound selected from a group consisting of elemental sulfur, $SO_2$, sulfuric acid and sulfate salts, said method comprising:

(a) contacting a sulfur oxide containing flue gas, resulting from the combustion of sulfur-containing hydrocarbons, and containing carbon dioxide in concentrations greater than that of the sulfur oxide in said gas, with ammonia and an aqueous liquor, whereby a sulfur oxide containing product is selectively formed and the resulting gas has a reduced $SO_2$ content;

(b) reacting a sulfur oxide containing product resulting from step (a) with a reagent selected from a group consisting of nitric acid, phosphoric acid, a mixture thereof and salts formed by the reaction of said acid(s) to form said fertilizer and a sulfur compound, and (c) separating at least a portion said sulfur compound from said fertilizer.

2. A method according to claim 1, wherein said sulfur oxide containing product formed in step (a) is oxidized prior to the reaction in step(b).

3. A method according to claim 2, wherein said reagent is a salt selected from a group consisting of calcium nitrate and acidulated calcium phosphate.

4. A method according to claim 3, wherein said calcium nitrate is a product of producing phosphoric acid, using nitric acid as an acidulant.

5. A method according to claim 4, where gypsum precipitates as a result of the reaction in step (b).

6. A method according to claim 1, wherein said sulfur compound formed in step (b) is $SO_2$.

7. A method according to claim 6, wherein said $SO_2$ is collected in a vapor phase.

8. A method according to claim 1, wherein said reagent in step (b) is acidic and step (b) is followed by treatment with a reducing agent to form a reduced sulfur compound.

9. A method according to claim 1, wherein said sulfur oxide containing gas is a result of flue gas desulfurization process.

10. A method according to claim 9, wherein said sulfur oxide containing gas is a result of flue gas desulfurization by lime wet scrubbing.

11. A method according to claim 9, wherein the $SO_2$ removal yield of said lime wet scrubbing Is less than 90%.

12. A fertilizer produced according to the method of claim 1.

13. A method according to claim 10, wherein the $SO_2$ removal yield of said lime wet scrubbing is less than 90%.

14. A method for the combined production of (I) a fertilizer selected from a group consisting of ammonium nitrate, ammonium phosphates and a combination thereof through an indirect neutralization of ammonia with an acid selected from a group consisting of nitric acid, phosphoric acid and a combination thereof and of (II) a sulfur compound selected from a group consisting of elemental sulfur, $SO_2$, sulfuric acid and sulfate salts, said method comprising:

(a) contacting a sulfur oxide containing flue gas, resulting from the combustion of sulfur-containing oil or coal, with ammonia and an aqueous liquor, whereby a sulfur oxide containing product is selectively formed and the resulting gas has a reduced $SO_2$ content;

(b) reacting a sulfur oxide containing product resulting from step (a) with a reagent selected from a group consisting of nitric acid, phosphoric acid, a mixture thereof and salts formed by the reaction of said acid(s) to form said fertilizer and a sulfur compound, and (c) separating at least a portion said sulfur compound from said fertilizer.

* * * * *